United States Patent
Tanaka (10) Patent No.: US 10,544,240 B2
(45) Date of Patent: Jan. 28, 2020

(54) ETHYLENE POLYMER, STRETCHED MOLDED ARTICLE, MICROPOROUS MEMBRANE AND FIBER

(71) Applicant: Asahi Kasei Kabushiki Kaisha, Tokyo (JP)

(72) Inventor: Kenya Tanaka, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/778,985

(22) PCT Filed: Jan. 30, 2018

(86) PCT No.: PCT/JP2018/002961
§ 371 (c)(1),
(2) Date: May 24, 2018

(87) PCT Pub. No.: WO2018/143191
PCT Pub. Date: Aug. 9, 2018

(65) Prior Publication Data
US 2019/0359740 A1 Nov. 28, 2019

(30) Foreign Application Priority Data
Feb. 3, 2017 (JP) .................... 2017-018676

(51) Int. Cl.
*C08F 10/02* (2006.01)
*C08J 9/00* (2006.01)
(Continued)

(52) U.S. Cl.
CPC ............. *C08F 10/02* (2013.01); *C08J 9/00* (2013.01); *B29C 55/12* (2013.01);
(Continued)

(58) Field of Classification Search
None
See application file for complete search history.

(56) References Cited

U.S. PATENT DOCUMENTS 5,210,130 A 5/1993 Howard, Jr.
2006/0287449 A1 12/2006 Miyamoto et al.
(Continued)

FOREIGN PATENT DOCUMENTS

CN 103864970 A 6/2014
EP 3293212 A1 * 3/2018 .............. C08L 23/06
(Continued)

OTHER PUBLICATIONS

Kang, T. "Isothermal Crystallization Study for Quality Assurance". Retrieved from https://www.perkinelmer.com on Sep. 13, 2019. ( Year: 2011).*
(Continued)

*Primary Examiner* — Richard A Huhn
(74) *Attorney, Agent, or Firm* — Morgan, Lewis & Bockius LLP (57) ABSTRACT

The present invention provides an ethylene polymer having a viscosity average molecular weight of $100 \times 10^4$ or more and $1,000 \times 10^4$ or less, in which a ratio between an isothermal crystallization time at 125° C. and an isothermal crystallization time at 123° C. obtained under specific isothermal crystallization time measurement conditions is 3.5 or more and 10.0 or less, and a degree of crystallization obtained using a differential scanning calorimeter (DSC) is 40% or more and 75% or less.

9 Claims, 1 Drawing Sheet (51) Int. Cl.
  *B29C 55/12* (2006.01)
  *B29L 31/00* (2006.01)
  *B29K 23/00* (2006.01)

(52) U.S. Cl.
  CPC ............... *B29K 2023/0658* (2013.01); *B29K 2995/004* (2013.01); *B29K 2995/0063* (2013.01); *B29K 2995/0088* (2013.01); *B29L 2031/755* (2013.01)

(56) References Cited

U.S. PATENT DOCUMENTS

| | | | |
|---|---|---|---|
| 2013/0005845 A1 | 1/2013 | Yamamoto et al. | |
| 2017/0247526 A1* | 8/2017 | Botros | C08K 3/01 |
| 2017/0373291 A1* | 12/2017 | Kaneda | C08J 9/28 |

FOREIGN PATENT DOCUMENTS

| | | |
|---|---|---|
| JP | S62-057407 A | 3/1987 |
| JP | H02-021559 A | 1/1990 |
| JP | H06-509591 A | 10/1994 |
| JP | 2566112 B | 10/1996 |
| JP | 2005-029731 A | 2/2005 |
| JP | 2012-229355 A | 11/2012 |
| JP | 2013-032490 A | 2/2013 |
| JP | 2015-172210 A | 10/2015 |
| JP | 2016-007838 A | 1/2016 |
| WO | 2016/104791 A1 | 6/2016 |

OTHER PUBLICATIONS

Written Opinion and International Search Report issued in corresponding PCT/JP2018/002961 dated Mar. 6, 2018.

* cited by examiner

ETHYLENE POLYMER, STRETCHED MOLDED ARTICLE, MICROPOROUS MEMBRANE AND FIBER

TECHNICAL FIELD

The present invention relates to an ethylene polymer, and a stretched molded article, a microporous membrane and a fiber containing the same.

BACKGROUND ART

Ethylene polymers are used for various uses such as films, sheets, microporous membranes, a fibers, foam bodies and pipes. Ethylene polymers are used because melt-processing of them are easy and molded articles obtained therefrom have high mechanical strength and are excellent also in chemical resistance, rigidity and the like. In particular, ultrahigh molecular weight ethylene polymers have large molecular weights and hence have higher mechanical strength, are excellent in slidability and wear resistance and are excellent also in chemical stability and long-term reliability.

The ultrahigh molecular weight ethylene polymers are, however, low flowability even when crystals thereof are melted at a temperature equal to or higher than its melting point, and hence melt-molding cannot easily be performed. Therefore, processing methods in which ultrahigh molecular weight ethylene polymer powders are filled in molds, the resultants are compressed at high pressure to produce molded article blocks, and the blocks are cut into film or sheet shapes are generally employed (see, for example, Patent Literature 1). As another processing method, a method in which the ultrahigh molecular weight ethylene polymers dissolved in a solvent is processed and then the solvent is removed therefrom is selected. For example, microporous membranes, high-strength fibers and the like are heated and kneaded together with a solvent such as liquid paraffin or decalin by an extruder to be processed into membrane or fiber shapes while cooling. Thereafter, the solvent is removed by extraction or the like, and the resultant is heated again up to the vicinity of the melting point for stretching or heat setting (see, for example, Patent Literature 2).

In this manner, the ultrahigh molecular weight ethylene polymers are finely processed by repeating melt and solidification with the temperature highly accurately controlled, so that physical properties of resultant molded articles can be controlled. In using an ethylene polymer, that is, a semi-crystalline resin, the physical properties of molded articles are largely affected by the degree of crystallization, a crystal size, molecular orientation and the like, and a rate of the ethylene polymer crystallizing in accordance with temperature change is extremely significant.

As a known publication describing control of the rate of crystallization, for example, Patent Literature 3 discloses that if an isothermal crystallization time at a temperature lower by 25° C. than a melting point of a polyolefin resin is 200 seconds or less in a microporous membrane, crystallinity of a starting material and a film-forming property at a low draft ratio are so well balanced that raw film formation can be easily conducted.

Besides, for example, Patent Literature 4 discloses that for a microporous membrane, when a crystal nucleating agent is added to a polyolefin resin composition containing a polyolefin resin and a film forming solvent, a crystallization time is shortened, a porous structure of the resultant microporous membrane becomes more uniform and denser, and the mechanical strength and withstand voltage characteristics thereof are improved.

CITATION LIST

Patent Literature

Patent Literature 1: Japanese Patent No. 2566112
Patent Literature 2: Japanese Unexamined Patent Application Publication No. 2-21559
Patent Literature 3: Japanese Unexamined Patent Application Publication No. 2013-32490
Patent Literature 4: International Publication No. WO2016/104791

SUMMARY OF INVENTION

Technical Problem

Patent Literature 3 describes, however, merely an ultrahigh molecular weight ethylene polymer having a comparatively high crystallization rate, and does not mention an influence, on physical properties, of change in the crystallization rate occurring in accordance with temperature change. Besides, a time for heat setting tends to be longer for obtaining balance in the physical properties, and hence this technique has a problem of productivity.

Also Patent Literature 4 mentions merely an increase in the crystallization rate, and since a crystal nucleating agent is introduced to further increase the crystallization rate, there arise problems that a resultant film is difficult to coat because irregularities are formed in the film by the crystal nucleating agent remaining therein, that pores are collapsed by the crystal nucleating agent, that the resultant film is poor in uniformity because the crystallization rate is higher merely in the vicinity of the crystal nucleating agent, and the like.

The present invention was devised in consideration of the above-described problems, and an object of the present invention is to provide an ethylene polymer having a rapid temperature response of a crystallization rate and excellent in processability and production stability, and a stretched molded article, a microporous membrane and a fiber containing the ethylene polymer and excellent in strength and dimensional accuracy.

Solution to Problem

The present inventor has advanced research earnestly to solve the above-described problems, consequently found that an ethylene polymer having a prescribed viscosity average molecular weight, a prescribed degree of crystallization and a prescribed ratio between an isothermal crystallization time at 125° C. and an isothermal crystallization time at 123° C. can solve the above-described problem, and completed the present invention.

That is, the present invention is as follows.

[1]

An ethylene polymer, having a viscosity average molecular weight of $100 \times 10^4$ or more and $1,000 \times 10^4$ or less, in which a ratio between an isothermal crystallization time at 125° C. and an isothermal crystallization time at 123° C. obtained under the following isothermal crystallization time measurement conditions is 3.5 or more and 10.0 or less, and a degree of crystallization obtained using a differential scanning calorimeter (DSC) is 40.0% or more and 75.0% or less:

(Isothermal Crystallization Time Measurement Conditions)
1) a temperature is held at 50° C. for 1 minute, and then increased to 180° C. at a temperature increase rate of 200° C./min;
2) the temperature is held at 180° C. for 5 minutes, and then decreased to 122° C. at a temperature decrease rate of 80° C./min;
3) the temperature is held at 122° C. for 5 minutes, and then increased to 180° C. at a temperature increase rate of 200° C./min;
4) the temperature is held at 180° C. for 5 minutes, and then decreased to 123° C. at a temperature decrease rate of 80° C./min;
5) the temperature is held at 123° C. for 10 minutes, and then increased to 180° C. at a temperature increase rate of 200° C./min,
(the isothermal crystallization time at 123° C. is measured, assuming that a time of reaching 123° C. is a point of origin, 0 min);
6) the temperature is held at 180° C. for 5 minutes, and then decreased to 124° C. at a temperature decrease rate of 80° C./min;
7) the temperature is held at 124° C. for 15 minutes, and then increased to 180° C. at a temperature increase rate of 200° C./min;
8) the temperature is held at 180° C. for 5 minutes, and then decreased to 125° C. at a temperature decrease rate of 80° C./min; and
9) the temperature is held at 125° C. for 30 minutes, and then increased to 180° C. at a temperature increase rate of 200° C./min,
(the isothermal crystallization time at 125° C. is measured, assuming that a time of reaching 125° C. is a point of origin, 0 min).

[2]

The ethylene polymer according to [1], in which a difference between a melting point (Tm1) at a first melting peak and a melting point (Tm2) at a second melting peak obtained using the differential scanning calorimeter (DSC) is 0° C. or more and less than 10.0° C.

[3]

The ethylene polymer according to [1] or [2], in which a difference between a melting start temperature at a first melting peak and a melting start temperature at a second melting peak obtained using the differential scanning calorimeter (DSC) is 5.0° C. or more.

[4]

The ethylene polymer according to any one of [1] to [3], in which a total content of Ti and Al is 1.0 ppm or more and 30.0 ppm or less.

[5]

The ethylene polymer according to any one of [1] to [4], in which a content of chlorine is 30 ppm or less.

[6]

The ethylene polymer according to any one of [1] to [5], in which a total content of hydrocarbon components respectively having 16 and 18 carbon atoms extracted with hexane is 200 ppm or less.

[7]

A stretched molded article, containing the ethylene polymer according to any one of [1] to [6].

[8]

A microporous membrane, containing the ethylene polymer according to any one of [1] to [6].

[9]

A fiber, containing the ethylene polymer according to any one of [1] to [6].

Advantageous Effects of Invention

According to the present invention, an ethylene polymer having a rapid temperature response of a crystallization rate and excellent in processability and production stability, and a stretched molded article, a microporous membrane and a fiber containing the ethylene polymer and excellent in strength and dimensional accuracy can be realized.

DESCRIPTION OF EMBODIMENTS

An embodiment for practicing the present invention (hereinafter also referred to as the "present embodiment") will now be described in detail. It is noted that the present invention is not limited to the present embodiment but can be practiced in various modifications within the spirit and scope thereof.

[Ethylene Polymer]

An ethylene polymer of the present embodiment has a viscosity average molecular weight of $100 \times 10^4$ or more and $1,000 \times 10^4$ or less, a ratio between an isothermal crystallization time at 125° C. and an isothermal crystallization time at 123° C. of 3.5 or more and 10.0 or less, and a degree of crystallization obtained using a differential scanning calorimeter (DSC) of 40.0% or more and 75.0% or less. Now, these requirements will be described.

The ethylene polymer of the present invention is not particularly limited, and suitable examples include an ethylene homopolymer and a copolymer of ethylene and other comonomers. Examples of other comonomers include, but are not particularly limited to, α-olefins and vinyl compounds.

Examples of α-olefins include, but are not particularly limited to, α-olefins having 3 to 20 carbon atoms, and specifically include propylene, 1-butene, 4-methyl-1-pentene, 1-hexene, 1-octene, 1-nonene, 1-decene, 1-undecene, 1-dodecene, 1-tridecene and 1-tetradecene. Besides, examples of the vinyl compounds include, but are not particularly limited to, vinyl cyclohexane, styrene and a derivative thereof. As the other comonomers, nonconjugated polyenes such as 1,5-hexadiene and 1,7-octadiene can also be if needed.

The copolymers may be random terpolymers. One of the other comonomers may be used alone or in combination of two or more.

An amount of the other comonomers is preferably 0.20 mol % or less, more preferably 0.15 mol % or less, and still more preferably 0.10 mol % or less with respect to the ethylene polymer. When the amount of the other comonomers is 0.20 mol % or less, the degree of crystallization can be increased, and the ratio between an isothermal crystallization time at 125° C. and an isothermal crystallization time at 123° C. tends to be easily adjusted to a range of 3.5 or more and 10.0 or less. The amount of comonomers in the ethylene polymer can be checked by infrared analysis, NMR or the like.

A density of the ethylene polymer of the present embodiment is not particularly limited, and is preferably 910 kg/cm³ or more and 980 kg/cm³ or less, more preferably 915 kg/m³ or more and 970 kg/m³ or less, and still more preferably 920 kg/m³ or more and 965 kg/m³ or less. When the density of the ethylene polymer is 910 kg/cm³ or more and 980 kg/cm³ or less, the ratio between an isothermal crystallization time at 125° C. and an isothermal crystallization time at 123° C. of the ethylene polymer tends to be 3.5 or more and 10.0 or less, and a stretched molded article, a microporous membrane and a fiber containing the ethylene polymer of the present embodiment also attain excellent strength. Incidentally, the density of the ethylene polymer can be measured in accordance with JIS K7112 using a density measurement sample obtained by annealing a segment cut from a press sheet of an ethylene polymer powder at 120° C. for 1 hour and then cooling the resultant at 25° C. for 1 hour. The press sheet of the ethylene polymer powder can be produced in accordance with ASTM D1928 Procedure C using a mold having a length of 60 mm, a width of 60 mm and a thickness of 2 mm. More specifically, the density of the ethylene polymer can be measured by a method described in an example.

(Viscosity Average Molecular Weight (Mv))

The viscosity average molecular weight (Mv) of the ethylene polymer of the present embodiment is $100 \times 10^4$ or more and $1,000 \times 10^4$ or less, preferably $120 \times 10^4$ or more and $900 \times 10^4$ or less, and more preferably $140 \times 10^4$ or more and $800 \times 10^4$ or less. When the viscosity average molecular weight (Mv) is $100 \times 10^4$ or more, the ratio between an isothermal crystallization time at 125° C. and an isothermal crystallization time at 123° C. of the ethylene polymer described later tends to be increased, and a difference between a melting start temperature at a first melting peak and a melting start temperature at a second melting peak tends to be increased. Besides, an amount of a low molecular weight component contained in the ethylene polymer can be reduced. Furthermore, the stretched molded article, the microporous membrane and the fiber containing the ethylene polymer of the present embodiment attain excellent strength. Meanwhile, when the viscosity average molecular weight (Mv) is $1,000 \times 10^4$ or less, melt flowability, solubility in a solvent and stretchability are improved so that it can be easily processed.

The viscosity average molecular weight (Mv) of the ethylene polymer can be adjusted by appropriately adjusting polymerization conditions and the like by using a catalyst described later. With respect to the polymerization conditions, the viscosity average molecular weight can be adjusted specifically by allowing hydrogen to present in a polymerization system and/or by changing a polymerization temperature.

The viscosity average molecular weight (Mv) of the ethylene polymer of the present embodiment can be obtained as follows: solutions in which the ethylene polymer is dissolved in decalin at different concentrations are prepared, a solution viscosity at 135° C. of each of the solutions is measured, a reduced viscosity calculated based on the thus measured solution viscosity is extrapolated to a density of 0 to obtain a limiting viscosity, and based on the thus obtained limiting viscosity [η] (dL/g), a viscosity average molecular weight is calculated in accordance with the Formula A below. More specifically, it can be measured by a method described in Example.

$$Mv = (5.34 \times 10^4) \times [\eta]^{1.49} \qquad \text{Formula A}$$

(Ratio Between an Isothermal Crystallization Time at 125° C. and an Isothermal Crystallization Time at 123° C.)

An isothermal crystallization time refers to a value of a solidification time (a crystallization rate) measured at a fixed temperature following once melting a polymer at a temperature beyond a melting point thereof and then decreasing the temperature to the fixed temperature. Specifically, a differential scanning calorimeter (DSC) is used, and an aluminum pan charged with the ethylene polymer is placed in a heating furnace for melting the ethylene polymer by holding the temperature at 50° C. in a nitrogen atmosphere for 1 minute, increasing the temperature to 180° C. at a temperature increase rate of 200° C./min, and holding the temperature at 180° C. for 5 minutes. Next, the temperature is decreased to 122° C. at a temperature decrease rate of 80° C./min and the temperature is held at 122° C. Assuming that a time of reaching 122° C. is a point of origin (0 minute), a time when a peak top of an exothermic peak derived from crystallization is obtained can be measured as an isothermal crystallization time at 122° C. Subsequently, the temperature increase and decrease is similarly repeated to measure isothermal crystallization times at 123° C., 124° C. and 125° C.

The ratio between an isothermal crystallization time at 125° C. and an isothermal crystallization time at 123° C. of the present embodiment is measured by 1) holding a temperature at 50° C. for 1 minute, and then increasing the temperature to 180° C. at a temperature increase rate of 200° C./min; 2) holding the temperature at 180° C. for 5 minutes, and then decreasing the temperature to 122° C. at a temperature decrease rate of 80° C./min; 3) holding the temperature at 122° C. for 5 minutes, and then increasing the temperature to 180° C. at a temperature increase rate of 200° C./min; 4) holding the temperature at 180° C. for 5 minutes, and then decreasing the temperature to 123° C. at a temperature decrease rate of 80° C./min; 5) holding the temperature at 123° C. for 10 minutes, and then increasing the temperature to 180° C. at a temperature increase rate of 200° C./min, and here, measuring the isothermal crystallization time at 123° C., assuming that a time of reaching 123° C. is a point of origin, 0 min; 6) holding the temperature at 180° C. for 5 minutes, and then decreasing the temperature to 124° C. at a temperature decrease rate of 80° C./min; 7) holding the temperature at 124° C. for 15 minutes, and then increasing the temperature to 180° C. at a temperature increase rate of 200° C./min; 8) holding the temperature at 180° C. for 5 minutes, and then decreasing the temperature to 125° C. at a temperature decrease rate of 80° C./min; and 9) holding the temperature at 125° C. for 30 minutes, and then increasing the temperature to 180° C. at a temperature increase rate of 200° C./min, and here, measuring the isothermal crystallization time at 125° C., assuming that a time of reaching 125° C. is a point of origin, 0 min.

Specifically, the ratio between an isothermal crystallization time at 125° C. and an isothermal crystallization time at 123° C. of the present embodiment is obtained under the following isothermal crystallization time measurement conditions:

(Isothermal Crystallization Time Measurement Conditions)
1) a temperature is held at 50° C. for 1 minute, and then increased to 180° C. at a temperature increase rate of 200° C./min.
2) The temperature is held at 180° C. for 5 minutes, and then decreased to 122° C. at a temperature decrease rate of 80° C./min.
3) The temperature is held at 122° C. for 5 minutes, and then increased to 180° C. at a temperature increase rate of 200° C./min.
4) The temperature is held at 180° C. for 5 minutes, and then decreased to 123° C. at a temperature decrease rate of 80° C./min.

5) The temperature is held at 123° C. for 10 minutes, and then increased to 180° C. at a temperature increase rate of 200° C./min.
(The isothermal crystallization time at 123° C. is measured, assuming that a time of reaching 123° C. is a point of origin, 0 min.)
6) The temperature is held at 180° C. for 5 minutes, and then decreased to 124° C. at a temperature decrease rate of 80° C./min.
7) The temperature is held at 124° C. for 15 minutes, and then increased to 180° C. at a temperature increase rate of 200° C./min.
8) The temperature is held at 180° C. for 5 minutes, and then decreased to 125° C. at a temperature decrease rate of 80° C./min.
9) The temperature is held at 125° C. for 30 minutes, and then increased to 180° C. at a temperature increase rate of 200° C./min.
(The isothermal crystallization time at 125° C. is measured, assuming that a time of reaching 125° C. is a point of origin, 0 min.)

The ratio between an isothermal crystallization time at 125° C. and an isothermal crystallization time at 123° C. of the ethylene polymer of the present embodiment is a value obtained by dividing the isothermal crystallization time at 125° C. by the isothermal crystallization time at 123° C., and an isothermal crystallization time ratio between temperatures in the vicinity of the melting point of the ethylene polymer is a significant value determining physical properties of a molded molded article obtained therefrom by various molding processings. This ratio having a large value means that the crystallization rate or melting rate is largely varied by a small temperature difference, and can understood as "a temperature response of a crystallization rate being high" or "the temperature response of the crystallization rate being excellent".

The ratio between an isothermal crystallization time at 125° C. and an isothermal crystallization time at 123° C. of the ethylene polymer of the present invention is 3.5 or more and 10.0 or less, preferably 3.7 or more and 9.0 or less, and more preferably 3.9 or more and 8.0 or less. When the ratio between an isothermal crystallization time at 125° C. and an isothermal crystallization time at 123° C. is 3.5 or more, processability obtained in melt spinning is excellent, and while a gel containing the ethylene polymer is discharged through a nozzle to be cooled, the crystallization rapidly proceeds to increase the viscosity of the gel, and hence the resultant can be reeled at a high speed as well as the resultant fiber diameter tends to be stabilized. Besides, also in production of the microporous membrane, while a gel containing the ethylene polymer is discharged from a T-die to be air cooled, the gel is rapidly solidified, and hence, not only an amount of an additive adhering to a cooling roll can be small but also dripping of a solvent can be inhibited. Furthermore, in heat setting, orientation relaxation can be obtained in a short time, and hence, not only a production rate can be increased but also thermal shrinkage can be inhibited, and also heat resistance tends to be increased. Besides, in compression molding, the orientation relaxation can be obtained in a short time, a cooling time can be shortened because solidification rapidly proceeds by merely slightly lowering the temperature, and rapid molding can be performed. Meanwhile, when the ratio between an isothermal crystallization time at 125° C. and an isothermal crystallization time at 123° C. is 10.0 or less, change in the crystallization rate against temperature change is not too large, and hence stability in film formation tends to be excellent.

The isothermal crystallization time at 125° C. of the ethylene polymer of the present embodiment is not limited, and is preferably 20 minutes or less, more preferably 15 minutes of less, and still more preferably 10 minutes or less. When the isothermal crystallization time at 125° C. of the ethylene polymer is 20 minutes or less, a molding time can be economically preferably shortened.

The ratio between an isothermal crystallization time at 125° C. and an isothermal crystallization time at 123° C. of the ethylene polymer of the present embodiment can be adjusted to 3.5 or more and 10.0 or less by, for example, in production of the ethylene polymer, performing continuous polymerization by continuously supplying an ethylene gas, a solvent, a catalyst and the like to a polymerization system and continuously discharging the ethylene gas, the solvent, the catalyst and the like together with the generated ethylene polymer; performing stirring at a rotational speed of 50 rpm or less using a Maxblend blade; supplying ethylene and hydrogen from a gas phase; introducing a catalyst cooled to 10° C.±3° C.; separating the ethylene polymer from a solvent by centrifugation and setting an amount of the solvent contained in the ethylene polymer before drying to 70 mass % or less with respect to the weight of the ethylene polymer; deactivating a catalyst after separating a solvent as much as possible by centrifugation; or setting an amount of the comonomer to 0.2 mol % or less.

(Degree of Crystallization)

The degree of crystallization of the ethylene polymer of the present embodiment obtained using a differential scanning calorimeter (DSC) is 40.0% or more and 75.0% or less, preferably 42.0% or more and 65.0% or less, and more preferably 44.0% or more and 60.0% or less. When the degree of crystallization is 40.0% or more, there is a tendency, in the application to the microporous membrane, that the mechanical strengths such as puncture strength and tensile strength are increased and that the heat resistance is increased. Besides, in the application to the fiber, the fiber attains a high elastic modulus and high breaking strength. Meanwhile, when the degree of crystallization is 75.0% or less, the molded article tends to be excellent in flexibility and impact resistance.

The degree of crystallization can be adjusted to the above-described range by, for example, controlling a molecular weight and a molecular weight distribution of the ethylene polymer; controlling entanglement of molecular chains in accordance with polymerization conditions; or obtaining the ethylene polymer as a copolymer of ethylene and other comonomers.

The degree of crystallization of the ethylene polymer of the present embodiment obtained using a differential scanning calorimeter (DSC) is obtained in accordance with the following formula on the basis of an endothermic amount $\Delta Hm$ (J/g) obtained based on a peak area measured under conditions of holding a temperature at 50° C. for 1 minute, increasing the temperature to 190° C. at a temperature increase rate of 10° C./min, holding the temperature at 190° C. for 5 minutes, decreasing the temperature to 50° C. at a temperature decrease rate of 10° C./min, holding the temperature at 50° C. for 5 minutes, and then increasing the temperature to 190° C. at a temperature increase rate of 10° C./min:

$$\text{Degree of crystallization (\%)} = \Delta Hm/\Delta H \times 100$$

Here, ΔH represents a melting heat amount of perfect crystal, and as for polyethylene, the calculation can be performed, assuming that ΔH=293 J/g.
(Melting Point Difference Tm1-Tm2)

A difference (Tm1-Tm2) between a melting point at a first melting peak (Tm1) and a melting point at a second melting peak (Tm2) of the ethylene polymer of the present embodiment obtained using a differential scanning calorimeter (DSC) is preferably 0° C. or more and less than 10.0° C., more preferably 1.0° C. or more and less than 9.5° C., and still more preferably 2.0° C. or more and less than 9.0° C. The melting point at the first melting peak (Tm1) refers to, for example, a melting point at which the ethylene polymer is melted from a powder form, and the melting point at the second melting peak (Tm2) refers to a melting point at which the ethylene polymer once melted and then recrystallized is melted again.

When the difference between Tm1 and Tm2 is 0° C. or more, there is a tendency that a molded article having high strength and excellent in chemical resistance and wear resistance can be obtained. Meanwhile, when the difference between Tm1 and Tm2 is less than 10.0° C., there is a tendency that a molded article easily dissolved in a solvent, excellent in processability and excellent in creep resistance can be obtained.

The melting points of the melting peaks of the ethylene polymer obtained using a differential scanning calorimeter (DSC) can be measured under conditions of holding a temperature at 50° C. for 1 minute, increasing the temperature to 190° C. at a temperature increase rate of 10° C./min, and measuring the melting point at the first melting peak (Tm1), then holding the temperature at 190° C. for 5 minutes, decreasing the temperature to 50° C. at a temperature decrease rate of 10° C./min, holding the temperature at 50° C. for 5 minutes, increasing the temperature to 190° C. at a temperature increase rate of 10° C./min, and then measuring the melting point at the second melting peak (Tm2).

The difference between Tm1 and Tm2 of the present embodiment can be set to 0° C. or more and less than 10.0° C. by, for example, supplying ethylene and hydrogen from the gas phase; introducing the catalyst cooled to 10° C.±3° C.; separating the ethylene polymer from the solvent by the centrifugation and setting the amount of the solvent contained in the ethylene polymer before drying to 70 mass % or less with respect to the weight of the ethylene polymer; or setting an amount of a comonomer to 0.2 mol % or less.
(Melting Start Temperature Difference)

A difference between a melting start temperature at the first melting peak and a melting start temperature at the second melting peak of the ethylene polymer of the present embodiment obtained using a differential scanning calorimeter (DSC) is preferably 5.0° C. or more, more preferably 6.0° C. or more, and still more preferably 7.0° C. or more. The melting start temperature at the first melting peak is also designated as Tm1 onset, and corresponds to, for example, a temperature at which the ethylene polymer starts to melt from a powder form. The melting start temperature at the second melting peak is also designated as Tm2 onset, and corresponds to, for example, a temperature at which the ethylene polymer once melted and recrystallized starts to melt again.

In general, the melting start temperature at the first melting peak tends to be higher than the melting start temperature at the second melting peak, and a difference therebetween is less than 5.0° C. When the difference is large, it can be said that the entanglement of molecular chains is increased or the entanglement of molecular chains is difficult to loose when the polymer is once melted and recrystallized than when it is in a powder form. Therefore, an ethylene polymer having a difference between the melting start temperature at the first melting peak and the melting start temperature at the second melting peak of 5.0° C. or more includes a large number of entanglements of molecular chains, and a microporous membrane containing this ethylene polymer tends to have high mechanical strengths such as puncture strength and tensile strength and also have high heat resistance. Besides, the ethylene polymer powder tends to be good in solubility.

Besides, the difference between the melting start temperature at the first melting peak and the melting start temperature at the second melting peak is preferably 20.0° C. or less, more preferably 15.0° C. or less, and still more preferably 12.0° C. or less from the viewpoint of processability.

The melting start temperature at the first melting peak and the melting start temperature at the second melting peak of the ethylene polymer obtained using a differential scanning calorimeter (DSC) can be measured under conditions of holding a temperature at 50° C. for 1 minute, increasing the temperature to 190° C. at a temperature increase rate of 10° C./min, measuring the first melting peak, then holding the temperature at 190° C. for 5 minutes, decreasing the temperature to 50° C. at a temperature decrease rate of 10° C./min, holding the temperature at 50° C. for 5 minutes, increasing the temperature to 190° C. at a temperature increase rate of 10° C./min, and then measuring the second melting peak.
(Total Content of Ti and Al)

A total content of titanium (Ti) and aluminum (Al) in the ethylene polymer of the present embodiment is preferably 1.0 ppm or more and 30.0 ppm or less, more preferably 1.1 ppm or more and 20.0 ppm or less, and still more preferably 1.2 ppm or more and 10.0 ppm or less. The total content of Ti and Al refers mainly to an amount of a catalyst residue.

When the total content of Ti and Al is 1.0 ppm or more, the ratio between an isothermal crystallization time at 125° C. and an isothermal crystallization time at 123° C. is increased. In general, it is difficult to control the crystallization rate of the ethylene polymer using a crystal nucleating agent, and when a small amount of modified products of Ti and Al generated by catalyst deactivation is present, the ratio between an isothermal crystallization time at 125° C. and an isothermal crystallization time at 123° C. tends to be increased.

Meanwhile, when the total content of Ti and Al is 30.0 ppm or less, the ethylene polymer is little colored, and when it is molded, there is a tendency that degradation of the ethylene polymer is inhibited, that embrittlement, coloring and degradation in mechanical properties are difficult to occur, and that long-term stability is excellent.

The total content of Ti and Al in the ethylene polymer of the present embodiment can be controlled in accordance with productivity per unit catalyst of the ethylene polymer. The productivity of the ethylene polymer can be controlled in accordance with a polymerization temperature, a polymerization pressure and a slurry concentration in a reactor used in the production. In other words, the productivity of the ethylene polymer of the present embodiment can be increased by, for example, increasing the polymerization temperature; increasing the polymerization pressure; or increasing the slurry concentration. A catalyst to be used is not particularly limited, and any of general Ziegler-Natta catalysts and metallocene catalysts can be used, and catalysts described later are preferably used. Besides, Ti and Al can be removed from the ethylene polymer powder by, for example, separating the polyethylene powder from the solvent by the centrifugation and setting the amount of the solvent contained in the polyethylene powder before drying to 70 mass % or less with respect to the weight of the polyethylene powder; deactivating the catalyst after separating the solvent as much as possible by the centrifugation; or by washing the ethylene polymer powder with water or a weak acidic aqueous solution.

The total content of Ti and Al can be measured by a method described in an example below.
(Content of Chlorine)

A content of chlorine in the ethylene polymer of the present embodiment is preferably 30 ppm or less, more preferably 20 ppm or less, and still more preferably 10 ppm or less with respect to the entire amount of the ethylene polymer.

Besides, the lower limit of the content of chlorine is not particularly limited, and the content is preferably smaller, and more preferably 0 ppm.

When the content of chlorine is 30 ppm or less, the degradation of the ethylene polymer is inhibited, the embrittlement, the coloring and the degradation in the mechanical properties are difficult to occur, and the ethylene polymer is more excellent in the long-term stability. Besides, the content of chlorine of 30 ppm or less can make it difficult to corrode a roll, a mold and the like used in the molding processing, and can inhibit a corrosive component from contaminating a substance in contact with it.

The content of chlorine in the ethylene polymer of the present embodiment can be controlled by adjusting productivity of a polyolefin per unit catalyst.

The productivity of the ethylene polymer can be controlled in accordance with the polymerization temperature, the polymerization pressure and the slurry concentration in the reactor used in the production. In other words, the productivity of the ethylene polymer of the present embodiment can be increased by, for example, increasing the polymerization temperature; increasing the polymerization pressure; or increasing the slurry concentration. Besides, when a catalyst containing a small amount of a chlorine-containing component is used, the content of chlorine in the ethylene polymer can be reduced.

A catalyst to be used is not particularly limited, and any of general Ziegler-Natta catalysts and metallocene catalysts can be used, and from the viewpoint of reducing the content of chlorine, a metallocene catalyst described later is preferably used.

Incidentally, the content of chlorine can be measured by a method described in an example below.
(Total Content of Hydrocarbon Components Having 16 and 18 Carbon Atoms Extracted with Hexane)

A total content of hydrocarbon components respectively having 16 and 18 carbon atoms extracted with hexane in the ethylene polymer of the present embodiment is preferably 200 ppm or less, more preferably 160 ppm or less, and still more preferably 120 ppm or less. When the total content of the hydrocarbon components respectively having 16 and 18 carbon atoms extracted with hexane is 200 ppm or less, the ratio between an isothermal crystallization time at 125° C. and an isothermal crystallization time at 123° C. tends to be reduced. Besides, since the ethylene polymer is so difficult to be plasticized that the motion of molecular chains is restrained, the strength and the heat resistance tend to be improved.

Besides, the lower limit of the total content of the hydrocarbon components respectively having 16 and 18 carbon atoms extracted with hexane is not particularly limited, and the content is preferably smaller, and more preferably 0 ppm.

The ethylene polymer in which the total content of the hydrocarbon components respectively having 16 and 18 carbon atoms extracted with hexane is 200 ppm or less can be obtained by, in the production of the ethylene polymer, for example, using a catalyst difficult to generate the hydrocarbon components having 16 and 18 carbon atoms; performing the continuous polymerization by continuously supplying the ethylene gas, the solvent, the catalyst and the like to the polymerization system and continuously discharging the ethylene gas, the solvent, the catalyst and the like together with the generated ethylene polymer; performing the stirring at a rotational speed of 50 rpm or less using a Maxblend blade; using a hydrocarbon medium having 6 or more and 10 or less carbon atoms as a polymerization solvent; supplying ethylene and hydrogen from the gas phase; introducing the catalyst cooled to 10° C.±3° C.; separating the ethylene polymer from the solvent by the centrifugation and setting the amount of the solvent contained in the ethylene polymer before drying to 70 mass % or less with respect to the weight of the ethylene polymer; or deactivating the catalyst after separating the solvent as much as possible by the centrifugation.

Incidentally, the total content of the hydrocarbon components respectively having 16 and 18 carbon atoms extracted with hexane can be obtained based on peaks overlapping with standard substances of 16 and 18 carbon atoms in gas chromatography measured for components extracted from the ethylene polymer.
[Method for Producing Ethylene Polymer]

Examples of a polymerization method employed in a method for producing the ethylene polymer of the present embodiment include, but are not limited to, methods for (co)polymerizing ethylene or a monomer containing ethylene by slurry polymerization, gas phase polymerization, solution polymerization or the like. Among these, the slurry polymerization, in which heat of polymerization can be efficiently removed, is preferred. In the slurry polymerization, an inert hydrocarbon medium can be used as a medium, and also an olefin itself can be used as the medium.

The inert hydrocarbon medium is not particularly limited, and specific examples include aliphatic hydrocarbons such as propane, butane, isobutane, pentane, isopentane, hexane, heptane, octane, decane, dodecane and kerosene; alicyclic hydrocarbons such as cyclopentane, cyclohexane and methyl cyclopentane; aromatic hydrocarbons such as benzene, toluene and xylene; halogenated hydrocarbons such as ethyl chloride, chlorobenzene and dichloromethane; and mixtures of any of these.

In the present embodiment, an inert hydrocarbon medium having 6 or more and 10 or less carbon atoms is preferably used. When the number of carbon atoms is 6 or more, a low molecular weight component generated in a side reaction occurring in ethylene polymerization or in degradation of the ethylene polymer is comparatively easily dissolved therein, and hence can be easily removed in a step of separating the ethylene polymer from the polymerization medium. When a low molecular weight component contained in the ethylene polymer is reduced, the ratio between an isothermal crystallization time at 125° C. and an isothermal crystallization time at 123° C. can be adjusted to 3.5 or more and 10.0 or less. Meanwhile, when the number of carbon atoms is 10 or less, there is a tendency that an industrially stable operation can be performed with adhesion of the ethylene polymer to the reactor and the like inhibited.

The polymerization temperature in the method for producing the ethylene polymer of the present embodiment is usually preferably 30° C. or more and 100° C. or less, more preferably 35° C. or more and 95° C. or less, and still more preferably 40° C. or more and 90° C. or less. When the polymerization temperature is 30° C. or more, there is a tendency that the production can be industrially efficiently performed. Meanwhile, when the polymerization temperature is 100° C. or less, there is a tendency that a stable operation can be continuously performed.

In the present embodiment, the polymerization pressure employed in the method for producing the ethylene polymer is usually preferably normal pressure or more and 2.0 MPa or less, more preferably 0.1 MPa or more and 1.5 MPa or less, and still more preferably 0.1 MPa or more and 1.0 MPa or less.

The polymerization reaction can be performed by any of a batch method, a semi-continuous method and a continuous method, and in particular, the continuous method is preferably employed for the polymerization. When the ethylene gas, the solvent, the catalyst and the like are continuously supplied to the polymerization system and the ethylene gas, the solvent, the catalyst and the like are continuously discharged together with the generated ethylene polymer powder, a partial high-temperature state otherwise caused by a rapid ethylene reaction can be inhibited, and the polymerization system tends to be more stabilized. When ethylene is polymerized in a uniform system, the isothermal crystallization time of the ethylene polymer can be made uniform, and hence the temperature response of the crystallization rate tends to be increased.

In the method for producing the ethylene polymer of the present embodiment, the polymerization is preferably performed dividedly in two or more stages performed under different reaction conditions.

A stirring blade of a polymerization reactor can be selected from various stirring blades, and a Maxblend blade is preferably used. When a Maxblend blade is used, the polymerization system tends to become more uniform. The rotational speed of the stirring blade is preferably 50 rpm or less, more preferably 48 rpm or less, and still more preferably 46 rpm or less. When the stirring is performed using a Maxblend blade having high stirring efficiency at 50 rpm or less, the polymerization system can become more uniform. Besides, the polymerization can be performed without crushing the ethylene polymer powder, and hence the production can be performed without changing the characteristics among powders.

Examples of a catalyst component to be used in the production of the ethylene polymer of the present embodiment suitably include Ziegler-Natta catalysts, metallocene catalysts and Phillips catalysts. As the Ziegler-Natta catalysts, those described in Japanese Patent No. 5767202 can be suitably used, and as the metallocene catalysts, for example, those described in Japanese Unexamined Patent Application Publication No. 2006-273977 and Japanese Patent No. 4868853 can be suitably used although not limited to these. Besides, the catalyst component to be used in the production of the ethylene polymer of the present embodiment may contain a promoter such as triisobutylaluminum or a Tebbe reagent.

In the present embodiment, an average particle size of the catalyst is preferably 0.1 μm or more and 20 μm or less, more preferably 0.2 μm or more and 16 μm or less, and still more preferably 0.5 μm or more and 12 μm or less. When the average particle size is 0.1 μm or more, there is a tendency that a problem of scattering and adhesion of the ethylene polymer particle to be obtained can be prevented. Besides, when it is 10 μm or less, there is a tendency that a problem that the ethylene polymer particle is too large to precipitate within the polymerization system and a problem that a line is clogged in a post-treatment step of the ethylene polymer can be prevented. A particle size distribution of the catalyst is preferably as narrow as possible, and a fine particle and a coarse particle can be removed by sieving, centrifuging or cycloning.

In the present embodiment, with respect to an introduction temperature of the catalyst, the catalyst is preferably cooled to 10° C.±3° C. before introducing. When the introduction temperature of the catalyst is 10° C.±3° C., an abrupt reaction otherwise caused at the initial stage of the introduction in which the activity of the catalyst is the highest can be inhibited, and there is a tendency that the polymerization system is more stabilized.

A method for deactivating the catalyst used for synthesizing the ethylene polymer is not particularly limited, and is preferably performed after separating the ethylene polymer powder from the solvent. When an agent for deactivating the catalyst is charged after the separation from the solvent, deposition of the catalyst component and the like dissolved in the solvent can be inhibited, and Ti, Al, chlorine and the like derived from the catalyst component can be reduced. Examples of the agent for deactivating the catalyst system include, but are not limited to, oxygen, water, alcohols, glycols, phenols, carbon monoxide, carbon dioxide, ethers, carbonyl compounds and alkynes.

In the present embodiment, the ethylene gas is preferably introduced into the gas phase present in an upper portion of the polymerization reactor. Although an ethylene gas is introduced into a liquid phase present in a bottom portion of a polymerization reactor in general, when an ethylene concentration in the vicinity of an outlet of an ethylene introduction line becomes high, an abrupt ethylene reaction occurs, and hence ethylene polymers different in molecular weight and isothermal crystallization time are easily generated and the temperature response of the crystallization rate becomes low. Therefore, the ethylene gas is preferably introduced into the gas phase.

The molecular weight of the ethylene polymer can be adjusted, as described in West Germany Patent Application Publication No. 3127133, by allowing hydrogen to be present in the polymerization system or by changing the polymerization temperature, for example. When hydrogen is added as a chain transfer agent to the polymerization system, the molecular weight can be easily controlled to an appropriate range. When hydrogen is added to the polymerization system, a mole fraction of the hydrogen is preferably 0 mol % or more and 30 mol % or less, more preferably 0 mol % or more and 25 mol % or less, and still more preferably 0 mol % or more and 20 mol % or less.

Besides, from the viewpoint of adjusting the viscosity average molecular weight (Mv) and the ratio between an isothermal crystallization time at 125° C. and an isothermal crystallization time at 123° C. in the present embodiment, ethylene and hydrogen are preferably supplied from the gas phase. A concentration of hydrogen in ethylene in the gas phase is preferably 1 to 10,000 ppm, more preferably 10 to 7,000 ppm, and still more preferably 30 to 6,000 ppm.

A solvent separation method employed in the method for producing the ethylene polymer of the present embodiment can be performed by, for example, decantation, centrifugation or filtration, and from the viewpoint that efficiency of separation between the ethylene polymer and the solvent is good, the centrifugation is preferred. An amount of the solvent contained in the ethylene polymer after the separation of the solvent is not particularly limited, and is preferably 70 mass % or less, more preferably 60 mass % or less, and still more preferably 50 mass % or less with respect to the mass of the ethylene polymer. When the solvent is removed by drying in a state in which the amount of the solvent contained in the ethylene polymer is small, there is a tendency that the catalyst residue such as Al, Ti and chlorine contained in the solvent is difficult to remain in the ethylene polymer, and besides, the low molecular weight component can be reduced. When these components do not remain, the ratio between an isothermal crystallization time at 125° C. and an isothermal crystallization time at 123° C. can be adjusted to 3.5 or more and 10.0 or less.

The drying temperature in a method for producing an ethylene polymer of the present embodiment is usually preferably 50° C. or more and 150° C. or less, more preferably 50° C. or more and 140° C. or less, and still more preferably 50° C. or more and 130° C. or less. Efficient drying is possible when the drying temperature is 50° C. or more. Meanwhile, when the drying temperature is 150° C. or less, the drying can be performed with aggregation and thermal deterioration of the ethylene polymer inhibited.

[Additive]

The ethylene polymer of the present embodiment can contain, in addition to the above-described components, other known components useful for the production of polyethylene. The ethylene polymer of the present embodiment may further contain, for example, additives such as a counteragent, an antioxidant and a light resistance stabilizer.

The counteragent is used as a chlorine scavenger of chlorine contained in the ethylene polymer, or a fabrication aid or the like. Specific examples of the counteragent include, but are not particularly limited to, stearates of alkaline earth metals such as calcium, magnesium and barium. The content of the counteragent is not particularly limited, but is preferably 5,000 ppm or less, more preferably 4,000 ppm or less, and still more preferably 3,000 ppm or less with respect to the entire amount of the ethylene polymer. If the ethylene polymer of the present embodiment is an ethylene polymer obtained by the slurry polymerization using a metallocene catalyst, a halogen component can be excluded from catalyst-constituting components, and there is no need to use the counteragent.

Specific examples of the antioxidant include, but are not particularly limited to, phenolic antioxidants such as dibutylhydroxytoluene, pentaerythrityl-tetrakis[3-(3,5-di-t-butyl-4-hydroxyphenyl)propionate] and octadecyl 3-(3,5-di-t-butyl-4-hydroxyphenyl)propionate. The content of the antioxidant is not particularly limited, but is preferably 5,000 ppm or less, more preferably 4,000 ppm or less, and still more preferably 3,000 ppm or less.

Specific examples of the light resistance stabilizer include, but are not particularly limited to, benzotriazole light resistance stabilizers such as 2-(5-methyl-2-hydroxyphenyl)benzotriazole and 2-(3-t-butyl-5-methyl-2-hydroxyphenyl)-5-chlorobenzotriazole; and hindered amine-based light stabilizers such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]. The content of the light resistance stabilizer is not particularly limited, but is preferably 5,000 ppm or less, more preferably 4,000 ppm or less, and still more preferably 3,000 ppm or less.

The content of an additive contained in the ethylene polymer of the present embodiment can be obtained by extracting the additive of the ethylene polymer by Soxhlet extraction using tetrahydrofuran (THF) for 6 hours, and separating and quantitatively determining the thus obtained extract by liquid chromatography.

In the ethylene polymer of the present embodiment, an ethylene polymer different in the viscosity average molecular weight, the molecular weight distribution and the like may be blended, or another resin such as a low density polyethylene, a linear low density polyethylene, polypropylene or polystyrene may be blended. Besides, the ethylene polymer of the present embodiment can be suitably used in the form of a powder or a pellet.

[Use]

The ethylene polymer obtained as described above and excellent in the temperature response of the crystallization rate can be used in various applications by employing various processing methods. Since a molded article containing the ethylene polymer of the present embodiment is excellent in strength and dimensional accuracy and is also excellent in heat resistance, it can be suitably used as a microporous membrane or a fiber. Examples of such a molded article include a separator for a secondary battery, particularly a lithium ion secondary battery separator, a lead-acid storage battery separator and a high-strength fiber. Besides, owing to features of the ethylene polymer having a high molecular weight, that is, excellent characteristics of wear resistance, high slidability, high strength and high impact resistance, the ethylene polymer of the present embodiment can be used, through molding in a solid form, such as extrusion molding, press molding or cutting work, as a gear, a roll, a curtain rail, a rail for a pachinko ball, a lining sheet of a storage silo for grain or the like, a slidability imparting coating for a rubber product or the like, a ski plate and a ski sole, and a lining material of heavy equipment such as a truck and a power shovel. Besides, the ethylene polymer of the present embodiment can be used as a molded article obtained by sintering the ethylene polymer, a filter, a dust trapping material or the like.

EXAMPLES

The present invention will now be described in more details with reference to examples and comparative examples, and it is noted that the present invention is not limited to the following examples.

[Methods for Measuring Various Characteristics and Physical Properties]

(1) Viscosity Average Molecular Weight (Mv)

First, 20 mg of the ethylene polymer was added to 20 mL of decalin (decahydronaphthalene), and the resultant was stirred at 150° C. for 2 hours for dissolving the polymer. The resultant solution was measured for a fall time ($t_s$) between marked lines in a constant temperature bath at 135° C. using an Ubbelohde-type viscometer. Similarly, three solutions containing the ethylene polymer in different weights were prepared, and the fall times thereof were measured. As a blank, a fall time ($t_b$) of decalin alone not containing the ethylene polymer was measured. Reduced viscosities ($\eta_{sp}/C$) of the polymer obtained in accordance with the following Formula A were plotted to draw a linear equation between a concentration (C) (unit: g/dL) and the reduced viscosity of the polymer ($\eta_{sp}/C$), and a limiting viscosity ([η]) was obtained through extrapolation to a density of 0.

$$\eta_{sp}/C=(t_s/t_b-1)/C \text{ (unit: dL/g)}$$

Next, the following Formula A was used to calculate the viscosity average molecular weight (Mv) by using a value of the limiting viscosity ($[\eta]$).

$$Mv=(5.34\times10^4)\times[\eta]^{1.49} \qquad \text{Formula A}$$

(2) Density

A density of the ethylene polymer was obtained by measurement, in accordance with JIS K7112, of a density measurement sample obtained by annealing a segment cut from a press sheet of the ethylene polymer powder at 120° C. for 1 hour, and cooling the resultant at 25° C. for 1 hour. The press sheet of the ethylene polymer powder was produced by using a mold having a length of 60 mm, a width of 60 mm and a thickness of 2 mm in accordance with ASTM D1928 Procedure C.

(3) Ratio Between Isothermal Crystallization Time at 125° C. and Isothermal Crystallization Time at 123° C.

The isothermal crystallization time was measured under nitrogen using a DSC (manufactured by Perkin Elmer Co., Ltd., tradename: DSC8000). Eight (8) to 10 mg of the ethylene polymer was put in an aluminum pan to be set in the DSC. Thereafter, under the following measurement conditions, times at which exothermic peak tops derived from crystallization were obtained were measured respectively at 123° C. and 125° C., and the thus obtained times were defined as the isothermal crystallization times. The ratio between an isothermal crystallization time at 125° C. and an isothermal crystallization time at 123° C. was obtained by dividing the isothermal crystallization time at 125° C. by the isothermal crystallization time at 123° C.

1) The temperature was held at 50° C. for 1 minute, and then increased to 180° C. at a temperature increase rate of 200° C./min.
2) The temperature was held at 180° C. for 5 minutes, and then decreased to 122° C. at a temperature decrease rate of 80° C./min.
3) The temperature was held at 122° C. for 5 minutes, and then increased to 180° C. at a temperature increase rate of 200° C./min.
4) The temperature was held at 180° C. for 5 minutes, and then decreased to 123° C. at a temperature decrease rate of 80° C./min.
5) The temperature was held at 123° C. for 10 minutes, and then increased to 180° C. at a temperature increase rate of 200° C./min.
(The isothermal crystallization time at 123° C. was measured, assuming that a time of reaching 123° C. is a point of origin, 0 min.)
6) The temperature was held at 180° C. for 5 minutes, and then decreased to 124° C. at a temperature decrease rate of 80° C./min.
7) The temperature was held at 124° C. for 15 minutes, and then increased to 180° C. at a temperature increase rate of 200° C./min.
8) The temperature was held at 180° C. for 5 minutes, and then decreased to 125° C. at a temperature decrease rate of 80° C./min.
9) The temperature was held at 125° C. for 30 minutes, and then increased to 180° C. at a temperature increase rate of 200° C./min.
(The isothermal crystallization time at 125° C. was measured, assuming that a time of reaching 125° C. is a point of origin, 0 min.)

(4) Degree of Crystallization

The degree of crystallization was measured under nitrogen using a DSC (manufactured by Perkin Elmer Co., Ltd., tradename: DSC8000). Eight (8) to 10 mg of the ethylene polymer was put in an aluminum pan to be set in the DSC. Thereafter, under the following measurement conditions, the degree of crystallization was obtained in accordance with the following Formula B on the basis of an endothermic amount $\Delta Hm$ (J/g) obtained based on a peak area measured in temperature increase performed in step 3:

$$\text{Degree of crystallization (\%)}=100\times\Delta Hm/\Delta H \qquad \text{Formula B}$$

Here, $\Delta H$ represents a melting heat amount of perfect crystal, and the calculation can be performed, assuming that $\Delta H=293$ J/g.

Step 1: The temperature was held at 50° C. for 1 minute, and then increased to 190° C. at a temperature increase rate of 10° C./min.

Step 2: The temperature was held at 190° C. for 5 minutes, and then decreased to 50° C. at a temperature decrease rate of 10° C./min.

Step 3: The temperature was held at 50° C. for 5 minutes, and then increased to 190° C. at a temperature increase rate of 10° C./min.

The melting point difference, Tm1−Tm2, and the melting start temperature difference were also measured under the same measurement conditions as those for the degree of crystallization described above.

(5) Total Content of Ti and Al

The ethylene polymer was pressure decomposed using a microwave decomposition apparatus (model ETHOS TC, manufactured by Milestone General K.K.), and element concentrations of Ti and Al as metals contained in a polyethylene powder were measured by an internal standard method using an ICP-MS (inductively coupled plasma mass spectrometer, model X series X7, manufactured by Thermo Fisher Scientific K.K.). The total content of Ti and Al is a sum of the element concentrations of Ti and Al.

(6) Content of Chlorine

After burning the ethylene polymer using an automatic sample combustion apparatus (manufactured by Mitsubishi Chemical Analytech Co., Ltd., AQF-100), the resultant was allowed to be absorbed by an absorbing liquid (a mixed solution of $Na_2CO_3$ and $NaHCO_3$), and the resultant absorbing liquid was injected into an ion chromatography apparatus (manufactured by Dionex Corporation, ICS1500, columns (separation column: AS12A, guard column: AG12A), suppressor ASRS300) to measure the content of chlorine.

(7) Total Content of Hydrocarbon Components Having 16 and 18 Carbon Atoms Extracted with Hexane A total content, in the ethylene polymer, of hydrocarbon components respectively having 16 and 18 carbon atoms extracted with hexane is obtained, by measurement performed as described below, based on peaks overlapping with those of standard substances having 16 and 18 carbon atoms in the gas chromatography of components extracted from the ethylene polymer.

A SUS vessel having a capacity of 100 mL was charged with 5 g of the ethylene polymer and 20 mL of hexane for PCB test manufactured by Wako Pure Chemical Industries Ltd., and the resultant was sealed. The SUS vessel was immersed as a whole in a warm bath at 60° C., extraction was performed for 5 hours under shaking at a rate of 50 $\text{min}^{-1}$, and the resultant was then immersed in water at 20° C. for rapid cooling.

The thus obtained supernatant was filtered using a glass syringe equipped with a 0.2 μm filter (made of PTFE) to obtain a sample. As for the standard substances having 16 and 18 carbon atoms, ASTM D5442 C16-C44 Qualitative Retention Time Mix manufactured by Sigma-Aldrich was dissolved in hexane for PCB test manufactured by Wako Pure Chemical Industries Ltd. to be used as the standard substances.

Apparatus: Shimadzu GC2014
Temperature: INJ 300° C.; OVEN 280° C. (injection amount: 2 µL)
Column: Silicone OV-1, 1.1 m
Carrier Gas: nitrogen
Detector: FID (8) Evaluation of Take-Up Speed and Blocking An ethylene polymer mixture was obtained by adding, as an antioxidant, 0.2 parts by mass of n-octadecyl-3-(4-hydroxy-3,5-di-t-butylphenyl)propionate to 100 parts by mass of the ethylene polymer powder, and dry blending the resultant using a tumbler blender. After substitution with nitrogen, 95 parts of decalin (manufactured by Hiroshima Wako Co., Ltd.) (5 parts of the ethylene polymer mixture) was introduced into the resultant ethylene polymer mixture to prepare a slurry liquid. The slurry liquid was put in an extruder set to a temperature of 280° C. and a melt retention time of 15 minutes to form a homogeneous solution. The resultant solution was spun at a single-hole discharge rate of 1.1 g/min using a spinning nozzle having a nozzle diameter of 0.7 mm set to 180° C. The thus extruded dissolved substance (thread) was taken up while cooling under air stream with a width of about 1.0 m, and wound around a roll disposed away from the spinning nozzle by 1.5 m. A take-up speed at this point and blocking of the thread wound around the roll, namely, whether or not threads are stuck together, were observed.

One having a maximum take-up speed of 60 m/min or more and having no thread blocking was evaluated as ⊚.

One having a maximum take-up speed of 50 m/min or more and less than 60 m/min and having no thread blocking was evaluated as ○.

One having a maximum take-up speed less than 50 m/min and having slight thread blocking was evaluated as Δ.

One having a maximum take-up speed less than 50 m/min and having thread blocking was evaluated as x.

(9) Evaluation of Adhesion to Roll and Dripping

An ethylene polymer mixture was obtained by adding, as an antioxidant, 0.2 parts by mass of pentaerythrityl tetrakis [3-(3,5-di-t-butyl-4-hydroxyphenyl)propionate] to 100 parts by mass of the ethylene polymer powder, and dry blending the resultant using a tumbler blender. After substitution with nitrogen, 65 parts of liquid paraffin (manufactured by Matsumura Oil Co., Ltd., P-350 (trademark)) (35 parts of the ethylene polymer mixture) was introduced into the resultant ethylene polymer mixture to prepare a slurry liquid. The slurry liquid was stirred for 3 hours at 80° C., and put in an extruder set to a temperature of 220° C. and a melt retention time of 15 minutes to form a homogeneous solution. The resultant solution was extruded through a T-die disposed at a tip of an extruder set to 210° C., and solidified by cooling with a cast roll cooled to 25° C. to form a gel sheet having a thickness of 1,000 µm. States of adhesion to the cast roll and dripping from the cast roll at this point were observed.

One little adhering to the cast roll and having no dripping was evaluated as ○.

One adhering to the cast roll and having dripping was evaluated as x.

(10) Thermal Shrinkage

The gel sheet obtained in (9) was stretched by 8×8 times at 125° C. using a simultaneous biaxial stretching machine, and the resultant sheet was fixed by a metal frame. The resultant stretched sheet was immersed in methyl ethyl ketone for removing the liquid paraffin by extraction, and was dried at 50° C. Subsequently, the stretched sheet was put in a constant temperature bath heated to 125° C. for 2 minutes for heat setting to obtain a microporous membrane. The resultant microporous membrane was cut into widths of 100 mm×100 mm, and the thus cut pieces were heated for 30 minutes in a hot air oven at 123° C. A thermal shrinkage (%) was obtained as a ratio of a shrunk area to an original area. Besides, a state of the membrane after the shrinkage was observed.

One having a shrinkage less than 1% and in a good membrane state was evaluated as ⊚.

One having a shrinkage of 1% or more and less than 2% and in a good membrane state was evaluated as ○.

One having a shrinkage of 2% or more and in a slightly wavy membrane state was evaluated as Δ.

One in a wavy membrane state was evaluated as x.

(11) Rust Test

The ethylene polymer was press molded in accordance with JIS K7139 to produce an ethylene polymer sheet having a widths of 100 mm×100 mm and a thickness of 1 mm. The resultant ethylene polymer sheet was laid on an iron plate (SUS316) having been degreased, and after preheating at 200° C. for 5 minutes, the resultant was hot-pressed at 10 MPa for 10 minutes. Next, the thus obtained sample was allowed to stand still in a constant temperature and humidity chamber at a temperature of 60° C. and humidity of 90% for 24 hours, and then the ethylene polymer sheet was peeled off for evaluation of rust on the iron plate.

One in which no rust was observed was evaluated as ⊚.

One in which rust was slightly observed in merely a small portion was evaluated as ○.

One having rust in the whole surface was evaluated as x.

[Reference Example] Synthesis Example of Catalyst

[Preparation of Supported Metallocene Catalyst Component [A]]

Spherical silica having an average particle size of 8 µm, a surface area of 700 m$^2$/g and a pore volume within a particle of 2.1 mL/g was calcined at 500° C. for 5 hours under a nitrogen atmosphere for dehydration. An amount of a surface hydroxyl group of the thus dehydrated silica was 1.85 mmol/g of $SiO_2$. In an autoclave having a capacity of 1.8 L, 40 g of the dehydrated silica was dispersed in 800 mL of hexane under a nitrogen atmosphere to obtain a slurry. To the thus obtained slurry, 80 mL of a hexane solution of triethylaluminum (at a concentration of 1 mol/L) was added under stirring with a temperature held at 50° C., followed by stirring for 2 hours to cause a reaction between triethylaluminum and the surface hydroxyl group of the silica, and thus, a component [a] containing triethylaluminum-treated silica and a supernatant in which the surface hydroxyl group of the triethylaluminum-treated silica was capped with the triethylaluminum was obtained. Thereafter, the supernatant in the thus obtained reaction mixture was removed by decantation to remove unreacted triethylaluminum remaining in the supernatant. Then, an appropriate amount of hexane was added thereto to obtain 880 mL of a hexane slurry of the triethylaluminum-treated silica.

Meanwhile, 200 mmol of [(N-t-butylamide) (tetramethyl-5-cyclopentadienyl)dimethylsilane]titanium-1,3-pentadiene (hereinafter referred to as the "titanium complex") was dissolved in 1,000 mL of Isopar E [tradename of a hydrocarbon mixture manufactured by Exxon Chemical (USA)], 20 mL of a 1 mol/L hexane solution of a formula $AlMg_6$ $(C_2H_5)_3(n\text{-}C_4H_9)_{12}$ precedently synthesized from triethylaluminum and dibutylmagnesium was added to the resultant, and hexane was further added thereto to adjust a titanium complex concentration to 0.1 mol/L, and thus, a component [b] was obtained.

Besides, 5.7 g of bis(hydrogenated tallow alkyl)methylammonium-tris(pentaflurophenyl) (4-hydroxyphenyl)borate (hereinafter referred to as the "borate") was added to and dissolved in 50 mL of toluene to obtain a 100 mmol/L toluene solution of the borate. To the toluene solution of the borate, 5 mL of a 1 mol/L hexane solution of ethoxydiethylaluminum was added at room temperature, and hexane was further added thereto to adjust a borate concentration in the resultant solution to 70 mmol/L. Thereafter, the resultant was stirred at room temperature for 1 hour to obtain a reaction mixture containing the borate.

Forty-six (46) mL of the reaction mixture containing the borate was added to 800 mL of the slurry of the component [a] obtained as described above at 15 to 20° C. with stirring to cause the borate to be supported on the silica. In this manner, a slurry of the silica supporting the borate was obtained. Besides, 32 mL of the component [b] obtained as described above was added thereto, followed by stirring for 3 hours to cause a reaction between the titanium complex and the borate. In this manner, a supported metallocene catalyst [A] containing the silica and the supernatant with a catalytically active species formed on the silica (hereinafter also referred to as the solid catalyst component [A]) was obtained.

Thereafter, the supernatant in the thus obtained reaction mixture was removed by the decantation to remove unreacted triethylaluminum remaining in the supernatant.

[Preparation of Solid Catalyst Component [B]]
(1) Synthesis of Support (B-1)

An 8 L stainless steel autoclave sufficiently substituted with nitrogen was charged with 1,000 mL of a 2 mol/L hexane solution of hydroxytrichlorosilane, and 2,550 mL (corresponding to 2.68 mol of magnesium) of a hexane solution of an organic magnesium compound represented by a composition formula, $AlMg_5(C_4H_9)_{11}(OC_4H_9)_2$ was added thereto in a dropwise manner over 4 hours while stirring at 65° C., followed by further stirring at 65° C. for 1 hour to continue the reaction. After completing the reaction, a supernatant was removed, and the resultant was washed with 1,800 mL of hexane four times. The thus obtained solid (the support (B-1)) was analyzed to find that 8.31 mmol of magnesium was contained per gram of the solid.

(2) Preparation of Solid Catalyst Component [B]

To 1,970 mL of a hexane slurry containing 110 g of the support (B-1) described above, 110 mL of a 1 mol/L hexane solution of titanium tetrachloride and 110 mL of a 1 mol/L hexane solution of an organic magnesium compound represented by the composition formula $AlMg_5(C_4H_9)_{11}(OSiH)_2$ were simultaneously added over 1 hour under stirring at 10° C. After the addition, the reaction was continued at 10° C. for 1 hour. After completing the reaction, 1100 mL of a supernatant was removed and the resultant was washed twice with 1,100 mL of hexane to prepare a solid catalyst component [B]. An amount of titanium contained in 1 g of the solid catalyst component [B] was 0.75 mmol.

[Example 1] (Polymerization of Ethylene Polymer)

Hexane, ethylene, hydrogen and a catalyst were continuously supplied to a 300 L vessel-type polymerization reactor equipped with a Maxblend stirring blade. A polymerization pressure was 0.8 MPa. A polymerization temperature was held at 75° C. by jacket cooling. The hexane was adjusted to 20° C. and supplied from a bottom portion of the polymerization reactor at 32 L/hr. The solid catalyst component [A] was adjusted to 10° C. and added from the bottom portion of the polymerization reactor at a rate of 0.2 g/hr. using the solvent hexane as a feeding liquid, triisobutylaluminum was adjusted to 20° C. and added from a middle portion of the polymerization reactor at a rate of 5 mmol/hr., and the Tebbe reagent was adjusted to 25° C. and added from the bottom portion of the polymerization reactor at a rate of 0.3 μmol/hr. The ethylene and hydrogen were introduced into a gas phase, and the hydrogen was continuously supplied using a pump so that a hydrogen concentration in ethylene in the gas phase could be 130 ppm. A rotational speed of the stirring blade in a stirring device was 40 rpm. A rate of producing the ethylene polymer was 10 kg/hr., and catalyst activity was 11,000 g-PE/g-the solid catalyst component [A]. A polymerization slurry was drawn to a flash drum at a pressure of 0.05 Mpa and a temperature of 60° C. continuously so that a level within the polymerization reactor could be kept constant, and thus, unreacted ethylene and hydrogen were separated.

Next, the polymerization slurry was continuously fed to a centrifuge so that the level within the polymerization reactor could be held constant, and thus, the polymer was separated from the other components including the solvent. A content of the solvent at this point in the polymer was 45%.

Figure 1:
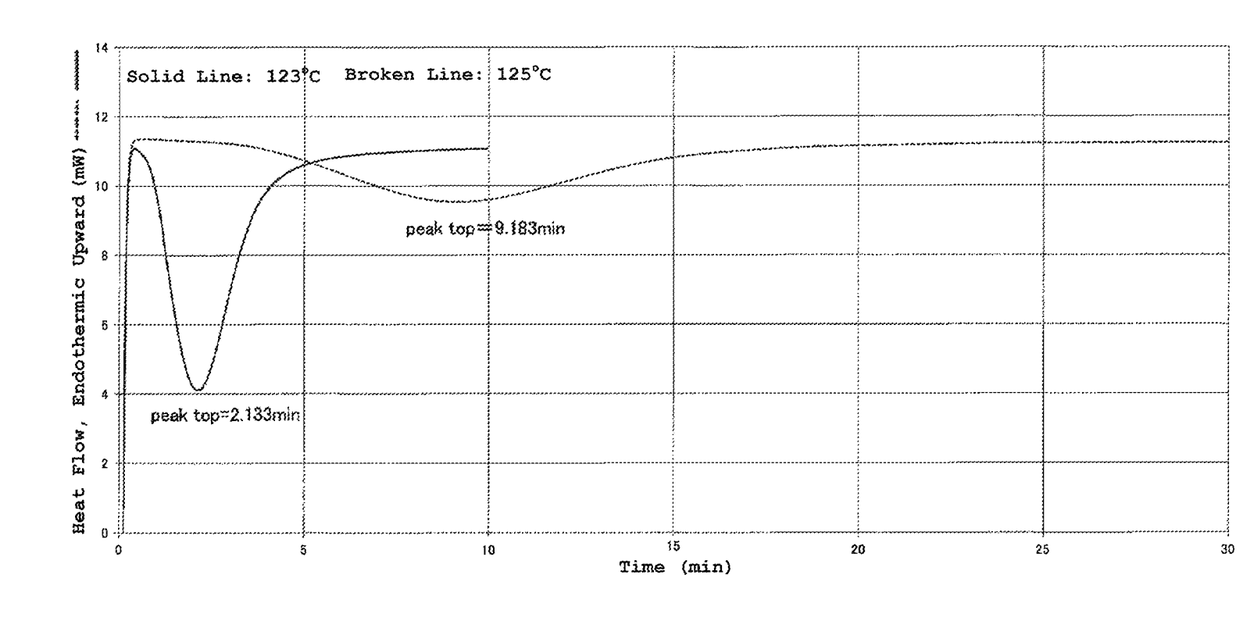
FIG. 1 shows a measurement chart of isothermal crystallization times at 125° C. and 123° C. obtained in Example 1.

The thus separated ethylene polymer powder was dried at 95° C. under nitrogen blow. Incidentally, in this drying step, the polymerized powder was sprayed with steam for deactivation of the catalyst and the promotor. To the obtained ethylene polymer powder, 1,000 ppm of calcium stearate (manufactured by Dainichi Chemical Industry Co., Ltd., C60) was added, and the resultant was uniformly mixed using a Henschel mixer. The thus obtained ethylene polymer powder was sifted through a sieve having an opening of 425 μm to remove a portion not passing through the sieve, and thus, an ethylene polymer powder having a viscosity average molecular weight of $151 \times 10^4$ g/mol was obtained. Physical properties of the thus obtained ethylene polymer are shown in Table 1. Besides, a measurement chart of isothermal crystallization times at 125° C. and 123° C. of the thus obtained ethylene polymer is illustrated in FIG. 1.

Example 2

An ethylene polymer of Example 2 having a viscosity average molecular weight of $200 \times 10^4$ g/mol was obtained through the same procedures as in Example 1 except that the polymerization temperature was set to 75° C. and the polymerization pressure was set to 0.35 MPa in the polymerization step, that the solid catalyst component [B] was used instead of the solid catalyst component [A], that the Tebbe reagent was not used, that the rate of triisobutylaluminum was changed to 3 mmol/hr., and that the hydrogen concentration was changed to 4,200 ppm. Physical properties of the thus obtained ethylene polymer are shown in Table 1.

Example 3

An ethylene polymer of Example 3 having a viscosity average molecular weight of $300 \times 10^4$ g/mol and containing 1-butene therein in a content of 0.03 mol % was obtained through the same procedures as in Example 1 except that the polymerization temperature was set to 69° C. and the polymerization pressure was set to 0.40 MPa in the polymerization step, that the solid catalyst component [B] was used instead of the solid catalyst component [A], that the Tebbe reagent was not used, that the rate of triisobutylaluminum was changed to 3 mmol/hr., that the hydrogen concentration was changed to 600 ppm, and that 1-butene was introduced from a gas phase in an amount of 0.11 mol % with respect to ethylene. Physical properties of the thus obtained ethylene polymer are shown in Table 1.

Example 4

An ethylene polymer of Example 4 having a viscosity average molecular weight of $600 \times 10^4$ g/mol and containing 1-butene therein in a content of 0.03 mol % was obtained through the same procedures as in Example 1 except that the polymerization temperature was set to 66° C. and the polymerization pressure was set to 0.35 MPa in the polymerization step, that the solid catalyst component [B] was used instead of the solid catalyst component [A], that the Tebbe reagent was not used, that the rate of triisobutylaluminum was changed to 3 mmol/hr., that the hydrogen concentration was changed to 100 ppm, and that 1-butene was introduced from a gas phase in an amount of 0.10 mol % with respect to ethylene. Physical properties of the thus obtained ethylene polymer are shown in Table 1.

Example 5

An ethylene polymer of Example 5 having a viscosity average molecular weight of $750 \times 10^4$ g/mol was obtained through the same procedures as in Example 1 except that the Tebbe reagent was supplied at 5.0 µmol/hr., and the hydrogen concentration was changed to 75 ppm in the polymerization step. Physical properties of the thus obtained ethylene polymer are shown in Table 1.

Example 6

An ethylene polymer of Example 6 having a viscosity average molecular weight of $750 \times 10^4$ g/mol and containing 1-butene therein in a content of 0.06 mol % was obtained through the same procedures as in Example 1 except that the Tebbe reagent was supplied at 3.5 µmol/hr., that the hydrogen concentration was changed to 80 ppm, and that 1-butene was introduced from a gas phase in an amount of 0.06 mol % with respect to ethylene in the polymerization step. Physical properties of the thus obtained ethylene polymer are shown in Table 1.

Comparative Example 1

An ethylene polymer of Comparative Example 1 having a viscosity average molecular weight of $60 \times 10^4$ g/mol was obtained through the same procedures as in Example 1 except that the polymerization temperature was set to 83° C. and the polymerization pressure was set to 0.5 MPa in the polymerization step, that the solid catalyst component [B] was used instead of the solid catalyst component [A], that the Tebbe reagent was not used, and that the hydrogen concentration was changed to 190 ppm. Physical properties of the thus obtained ethylene polymer are shown in Table 1.

Comparative Example 2

An ethylene polymer of Comparative Example 2 having a viscosity average molecular weight of $380 \times 10^4$ g/mol and containing 1-butene therein in a content of 0.4 mol % was obtained through the same procedures as in Example 1 except that the polymerization temperature was set to 65° C. and the polymerization pressure was set to 0.2 MPa in the polymerization step, that the solid catalyst component [B] was used instead of the solid catalyst component [A], that the Tebbe reagent and hydrogen were not used, and that 1-butene was introduced from a gas phase in an amount of 6.5 mol % with respect to ethylene. Physical properties of the thus obtained ethylene polymer are shown in Table 1. In the ethylene polymer of Comparative Example 2, a peak top of an exothermic peak derived from crystallization did not appear within 30 minutes at 125° C.

Comparative Example 3

An ethylene polymer of Comparative Example 3 having a viscosity average molecular weight of $550 \times 10^4$ g/mol and containing 1-butene therein in a content of 0.14 mol % was obtained through the same procedures as in Example 1 except that the Tebbe reagent was supplied at 3.5 µmol/hr., that the hydrogen concentration was changed to 80 ppm, and that 1-butene was introduced in an amount of 0.16 mol % with respect to ethylene. Physical properties of the thus obtained ethylene polymer are shown in Table 1.

Comparative Example 4

An ethylene polymer of Comparative Example 4 having a viscosity average molecular weight of $1,050 \times 10^4$ g/mol was obtained through the same procedures as in Example 1 except that the polymerization temperature was set to 55° C. and the polymerization pressure was set to 0.3 MPa in the polymerization step, that the solid catalyst component [B] was used instead of the solid catalyst component [A], and that the Tebbe reagent and hydrogen were not used. Physical properties of the thus obtained ethylene polymer are shown in Table 1. In the ethylene polymer of Comparative Example 4, a peak top of an exothermic peak derived from crystallization did not appear within 30 minutes at 125° C.

Comparative Example 5

Hexane, ethylene, hydrogen and a catalyst were continuously supplied to a 300 L vessel-type polymerization reactor equipped with an anchor type stirring blade. A polymerization pressure was 0.4 MPa. A polymerization temperature was held at 69° C. by jacket cooling. The hexane was adjusted to 20° C. and supplied from a bottom portion of the polymerization reactor at 32 L/hr. The supported metallocene catalyst component [A] was adjusted to 20° C. and added from the bottom portion of the polymerization reactor at a rate of 0.2 g/hr. using the solvent hexane as a feeding liquid, triisobutylaluminum was adjusted to 20° C. and added from the bottom portion of the polymerization reactor at a rate of 3 mmol/hr., and the Tebbe reagent was adjusted to 20° C. and added from the bottom portion of the polymerization reactor at a rate of 0.3 µmol/hr. The ethylene and hydrogen were introduced from a liquid phase of the bottom portion of the polymerization reactor, with hydrogen and 1-butene continuously supplied using a pump from a gas phase respectively in a hydrogen concentration in ethylene of 600 ppm and in an amount of 0.11 mol % with respect to ethylene. A rotational speed of the stirring blade in a stirring device was 100 rpm. A rate of producing the ethylene polymer was 10 kg/hr., and catalyst activity was 11,000 g-PE/g-the solid catalyst component [A]. A polymerization slurry was drawn to a flash drum at a pressure of 0.05 Mpa and a temperature of 60° C. continuously so that a level within the polymerization reactor could be kept constant, and thus, unreacted ethylene and hydrogen were separated.

Next, a small amount of methanol was added to the resultant polymerization slurry to deactivate the catalyst, and the resultant was filtered to remove the solvent. A content of the solvent and the like in the polymer after the filtration was 195%.

The thus separated and filtrated ethylene polymer powder was dried at 95° C. under nitrogen blow. Thereafter, the same procedures as those of Example 1 were performed to obtain an ethylene polymer of Comparative Example 5 having a viscosity average molecular weight of 300×10$^4$ g/mol, and containing 1-butene therein in an amount of 0.03 mol %. Physical properties of the thus obtained ethylene polymer are shown in Table 1.

TABLE 1

|  |  | Example 1 | Example 2 | Example 3 | Example 4 | Example 5 | Example 6 |
|---|---|---|---|---|---|---|---|
| Viscosity Average Molecular Weight (Mv) | g/mol | 151 × 10$^4$ | 200 × 10$^4$ | 300 × 10$^4$ | 600 × 10$^4$ | 750 × 10$^4$ | 750 × 10$^4$ |
| Density | kg/m$^3$ | 936.0 | 933.8 | 926.1 | 924.0 | 925.7 | 920.2 |
| Ratio between Isothermal Crystallization Time at 125° C. and Isothermal Crystallization Time at 123° C. | — | 4.3 | 3.7 | 5.6 | 4.8 | 6.5 | 7.8 |
| Degree of Crystallization | % | 53.2 | 71.4 | 50.8 | 48.1 | 47.1 | 40.2 |
| Melting Point Difference Tm1 − Tm2 | ° C. | 6.0 | 5.8 | 8.2 | 9.8 | 9.8 | 9.2 |
| Difference in Melting Start Temperature between First Melting Peak and Second Melting Peak | ° C. | 9.8 | 7.9 | 10.2 | 9.1 | 10.1 | 9.6 |
| Total Content of Ti and Al | ppm | 4.8 | 5.2 | 2.5 | 2.6 | 6.1 | 5.7 |
| Content of Chlorine | ppm | 1 or less | 9 | 10 | 24 | 1 or less | 1 or less |
| Total Content of Hydrocarbon Components having 16 and 18 Carbon Atoms Extracted with Hexane | ppm | 37 | 79 | 67 | 120 | 46 | 61 |
| Evaluation of Take-up Speed and Blocking of Threads | — | ○ | ◎ | ◎ | ◎ | ◎ | ◎ |
| Evaluation of Adhesion to Roll and Dripping | — | ○ | ○ | ○ | ○ | ○ | ○ |
| Thermal Shrinkage | — | ◎ | ○ | ◎ | ◎ | ◎ | ◎ |
| Rust Test | — | ◎ | ○ | ○ | ○ | ◎ | ◎ |

|  |  | Comparative Example 1 | Comparative Example 2 | Comparative Example 3 | Comparative Example 4 | Comparative Example 5 |
|---|---|---|---|---|---|---|
| Viscosity Average Molecular Weight (Mv) | g/mol | 60 × 10$^4$ | 380 × 10$^4$ | 550 × 10$^4$ | 1050 × 10$^4$ | 300 × 10$^4$ |
| Density | kg/m$^3$ | 941.9 | 918.2 | 920.7 | 924.2 | 926.3 |
| Ratio between Isothermal Crystallization Time at 125° C. and Isothermal Crystallization Time at 123° C. | — | 3.4 | — | 15.0 | — | 3.3 |
| Degree of Crystallization | % | 68.6 | 38.6 | 39 | 42.3 | 48.6 |
| Melting Point Difference Tm1 − Tm2 | ° C. | 3.3 | 10.1 | 9.6 | 9.8 | 11.7 |
| Difference in Melting Start Temperature between First Melting Peak and Second Melting Peak | ° C. | 2.9 | 10.2 | 9.6 | 10.5 | 6.1 |
| Total Content of Ti and Al | ppm | 3.4 | 3.2 | 6.7 | 11.5 | 10.6 |
| Content of Chlorine | ppm | 10 | 31 | 1 or less | 42 | 15 |
| Total Content of Hydrocarbon Components having 16 and 18 Carbon Atoms Extracted with Hexane | ppm | 207 | 237 | 55 | 325 | 210 |
| Evaluation of Take-up Speed and Blocking of Threads | — | X | X | Δ | Δ | X |
| Evaluation of Adhesion to Roll and Dripping | — | X | X | X | X | X |
| Thermal Shrinkage | — | X | X | Δ | Δ | Δ |
| Rust Test | — | ○ | X | ◎ | X | ○ |

Since the ethylene polymer of the present invention has a rapid temperature response of the crystallization rate, the viscosity of the resin is so rapidly increased that a thread diameter does not become too small or a thread is not cut even when rapidly drawn, and therefore, a take-up speed can be increased.

Besides, since the ethylene polymer of the present invention has a rapid temperature response of the crystallization rate, a solidifying speed of the resin is high, and hence, tackiness is reduced in a short time so as to prevent sticking of threads (blocking).

Furthermore, since the ethylene polymer of the present invention has a rapid temperature response of the crystallization rate, the viscosity of the resin is increased immediately after the resin is extruded through a T-die, a solvent is easily retained, the solvent is less oozed even when pressed by a cooling roll, and adhesion to the roll or dripping are inhibited.

In this manner, the ethylene polymer of the present invention can be produced and processed efficiently without causing any problems and is excellent in processability and production stability.

This application is based upon the prior Japanese patent application (Japanese Patent Application No. 2017-018676) filed on Feb. 3, 2017, the entire contents of which are incorporated herein by reference.

INDUSTRIAL APPLICABILITY

An ethylene polymer of the present invention has a rapid temperature response of a crystallization rate, is excellent in processability, and is excellent also in productivity and production stability. Besides, a stretched molded article, a microporous membrane, a fiber and the like containing the ethylene polymer are excellent in strength and dimensional accuracy, and thus, have high industrial applicability.

The invention claimed is:

1. An ethylene polymer, having a viscosity average molecular weight of $100 \times 10^4$ or more and $1,000 \times 10^4$ or less, wherein a ratio between an isothermal crystallization time at 125° C. and an isothermal crystallization time at 123° C. obtained under isothermal crystallization time measurement conditions is 3.5 or more and 10.0 or less, a degree of crystallization obtained using a differential scanning calorimeter (DSC) is 40.0% or more and 75.0% or less, and said isothermal crystallization time measurement conditions are 1) a temperature is held at 50° C. for 1 minute, and then increased to 180° C. at a temperature increase rate of 200° C./min;
2) the temperature is held at 180° C. for 5 minutes, and then decreased to 122° C. at a temperature decrease rate of 80° C./min;
3) the temperature is held at 122° C. for 5 minutes, and then increased to 180° C. at a temperature increase rate of 200° C./min;
4) the temperature is held at 180° C. for 5 minutes, and then decreased to 123° C. at a temperature decrease rate of 80° C./min;
5) the temperature is held at 123° C. for 10 minutes, and then increased to 180° C. at a temperature increase rate of 200° C./min, wherein the isothermal crystallization time at 123° C. is measured, assuming that a time of reaching 123° C. is a point of origin, 0 min;
6) the temperature is held at 180° C. for 5 minutes, and then decreased to 124° C. at a temperature decrease rate of 80° C./min;
7) the temperature is held at 124° C. for 15 minutes, and then increased to 180° C. at a temperature increase rate of 200° C./min;
8) the temperature is held at 180° C. for 5 minutes, and then decreased to 125° C. at a temperature decrease rate of 80° C./min; and
9) the temperature is held at 125° C. for 30 minutes, and then increased to 180° C. at a temperature increase rate of 200° C./min, wherein the isothermal crystallization time at 125° C. is measured, assuming that a time of reaching 125° C. is a point of origin, 0 min.

2. The ethylene polymer according to claim 1, wherein a difference between a melting point at a first melting peak (Tm1) and a melting point at a second melting peak (Tm2) obtained using the differential scanning calorimeter (DSC) is 0° C. or more and less than 10° C.

3. The ethylene polymer according to claim 1, wherein a difference between a melting start temperature at a first melting peak and a melting start temperature at a second melting peak obtained using the differential scanning calorimeter (DSC) is 5.0° C. or more.

4. The ethylene polymer according to claim 1, wherein a total content of Ti and Al is 1.0 ppm or more and 30.0 ppm or less.

5. The ethylene polymer according to claim 1, wherein a content of chlorine is 30 ppm or less.

6. The ethylene polymer according to claim 1, wherein a total content of hydrocarbon components respectively having 16 and 18 carbon atoms extracted with hexane is 200 ppm or less.

7. A stretched molded article, comprising the ethylene polymer according to claim 1.

8. A microporous membrane, comprising the ethylene polymer according to claim 1.

9. A fiber, comprising the ethylene polymer according to claim 1.

* * * * *